J. A. HICKS.
FLUID PRESSURE BRAKE SYSTEM.
APPLICATION FILED SEPT. 24, 1907.
944,486.
Patented Dec. 28, 1909.
5 SHEETS—SHEET 1.
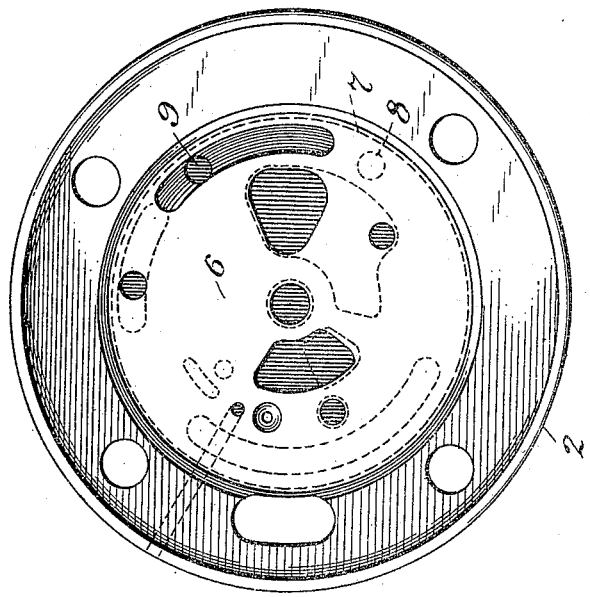
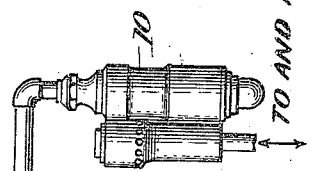
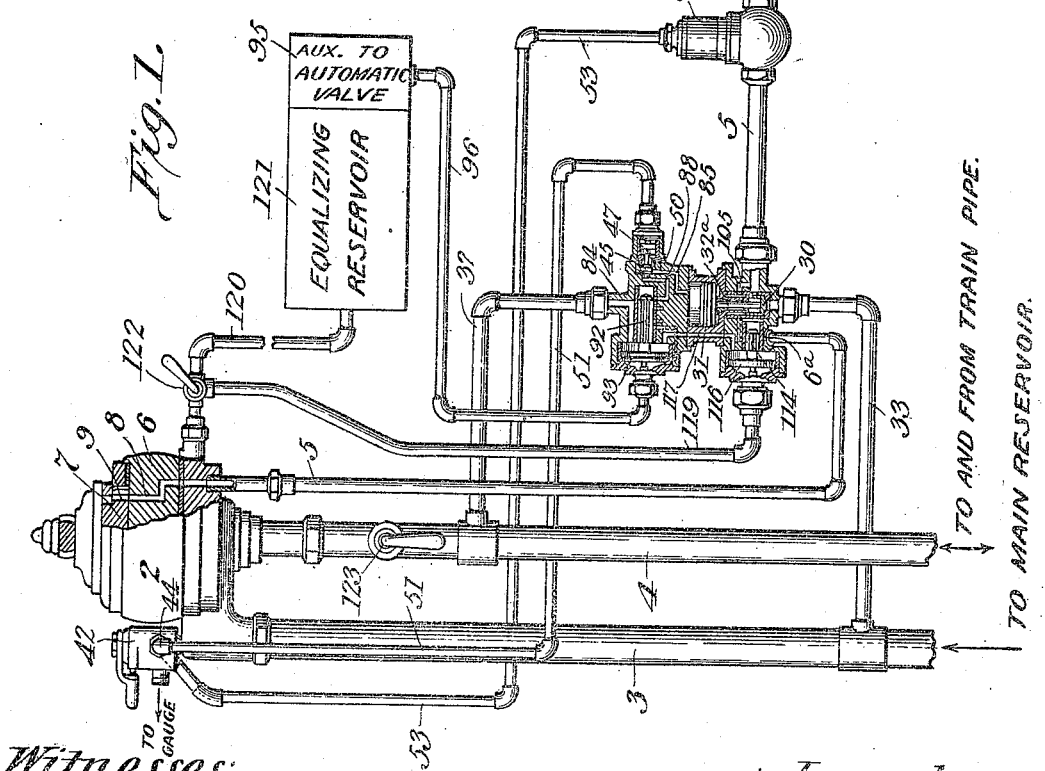

J. A. HICKS.
FLUID PRESSURE BRAKE SYSTEM.
APPLICATION FILED SEPT. 24, 1907.
944,486.
Patented Dec. 28, 1909.
5 SHEETS—SHEET 2.
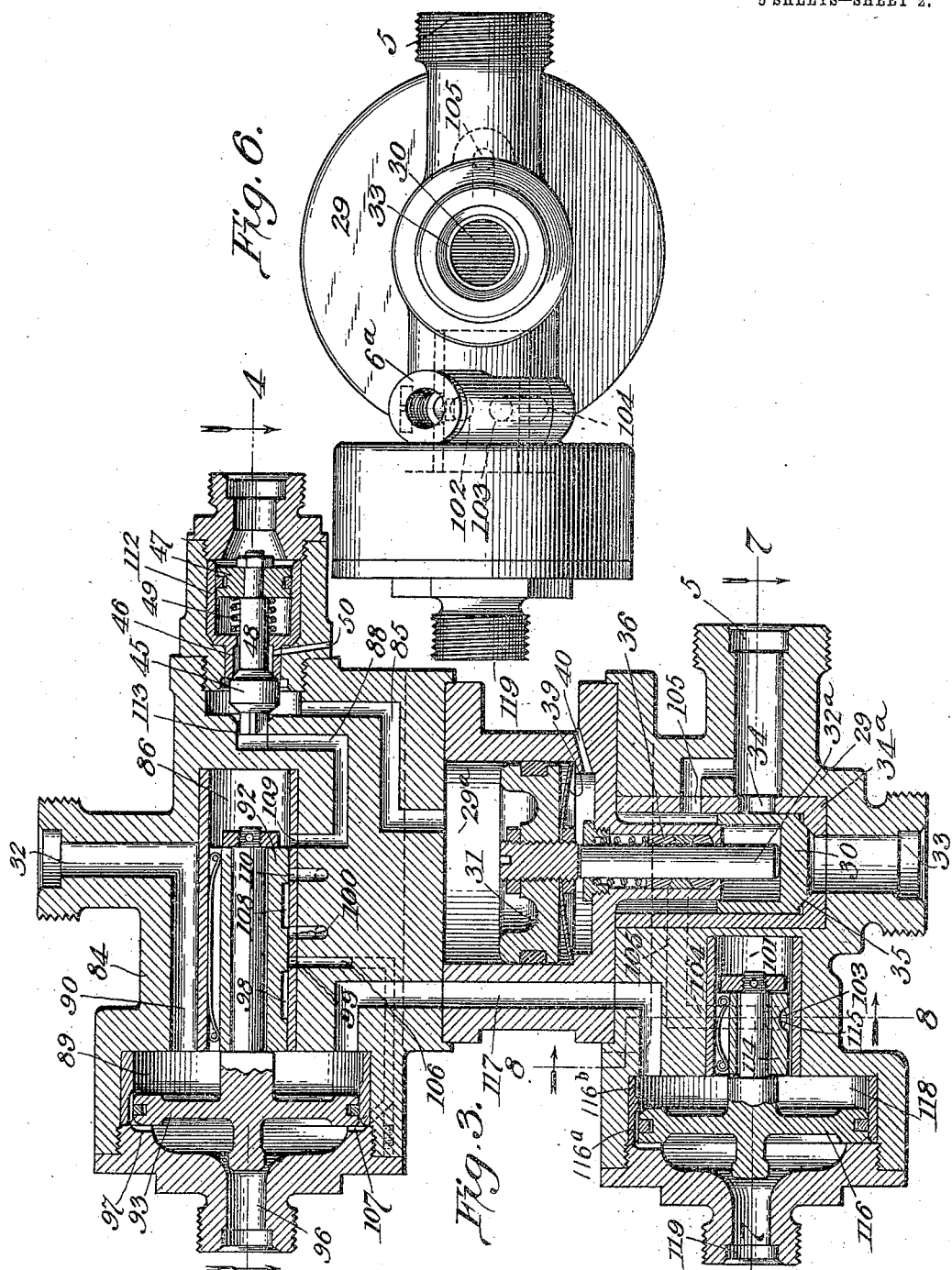
Witnesses:
Inventor,
James A. Hicks
By
J. H. C. Davis
Attorney.

J. A. HICKS.
FLUID PRESSURE BRAKE SYSTEM.
APPLICATION FILED SEPT. 24, 1907.
944,486.
Patented Dec. 28, 1909.
5 SHEETS—SHEET 3.
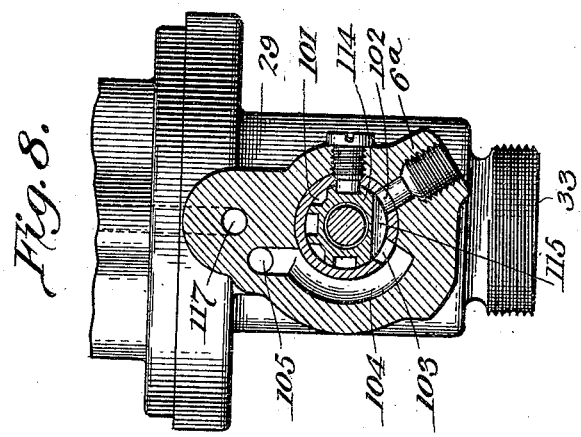
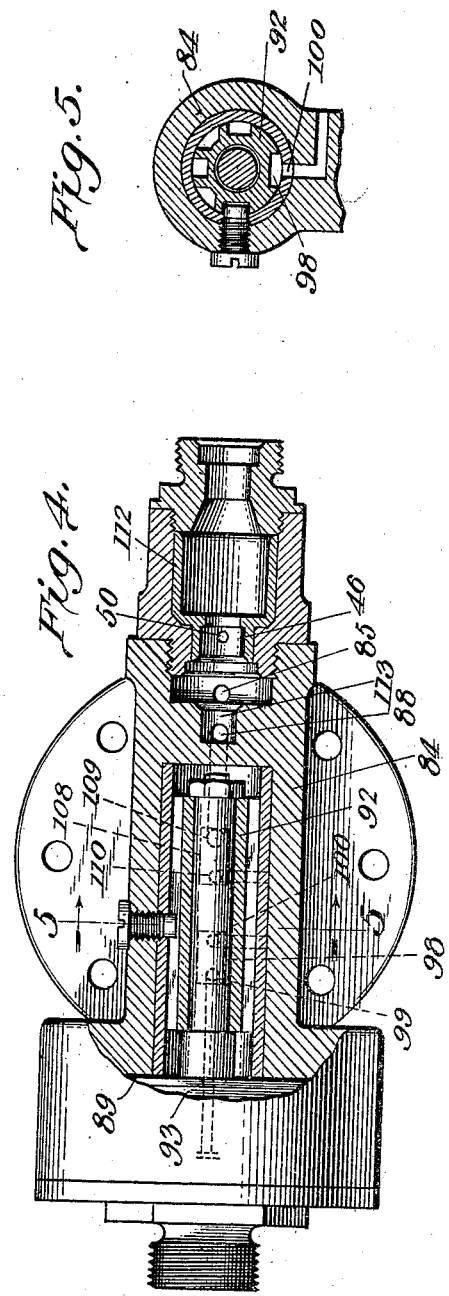
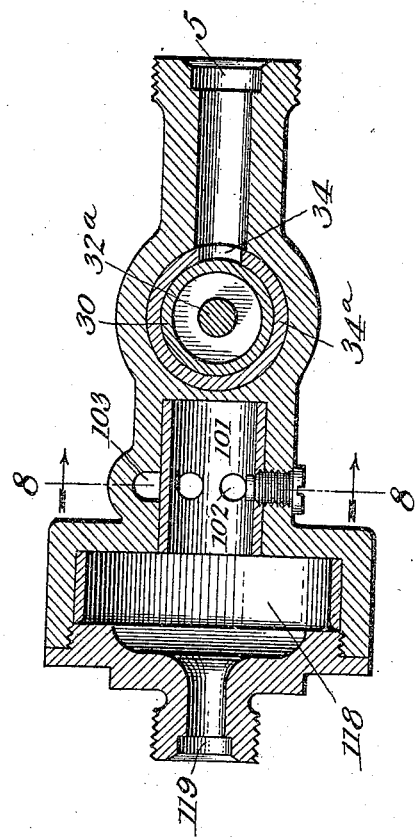
Witnesses:
Inventor,
James A. Hicks,
Attorney.

J. A. HICKS.
FLUID PRESSURE BRAKE SYSTEM.
APPLICATION FILED SEPT. 24, 1907.
944,486.
Patented Dec. 28, 1909.
5 SHEETS—SHEET 4.
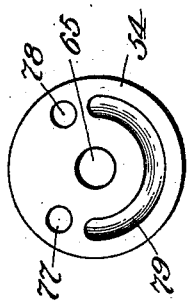
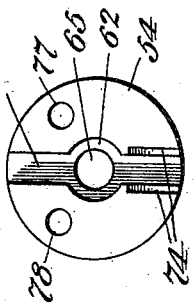
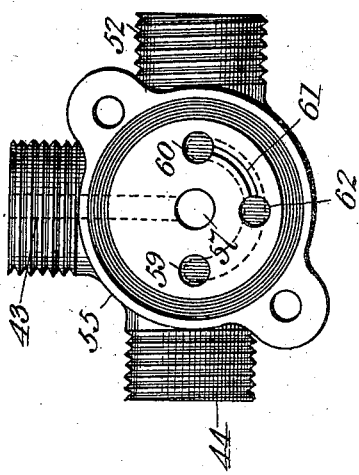
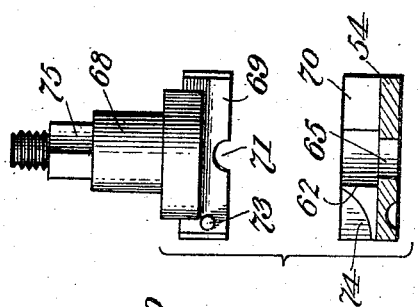
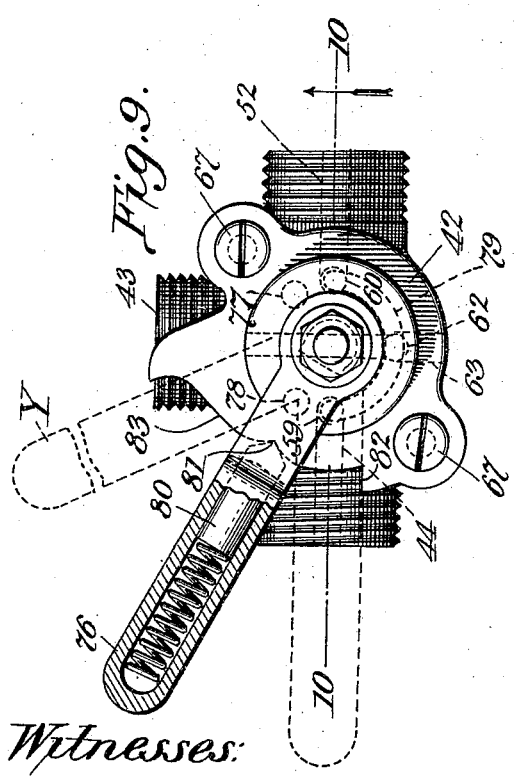
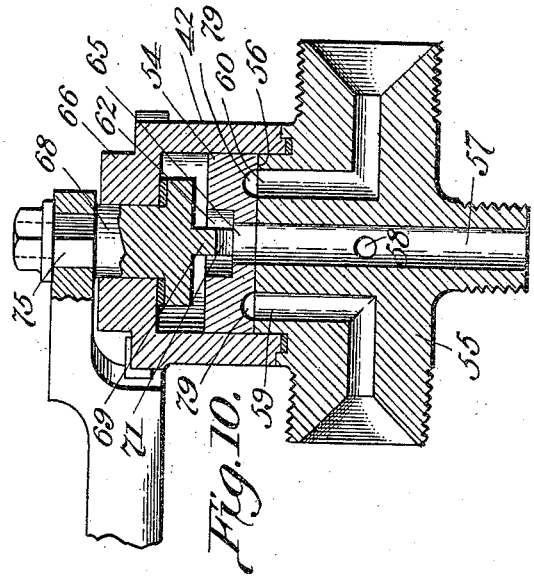
Witnesses:
Inventor
James A. Hicks
By
J. L. Davis
Attorney.

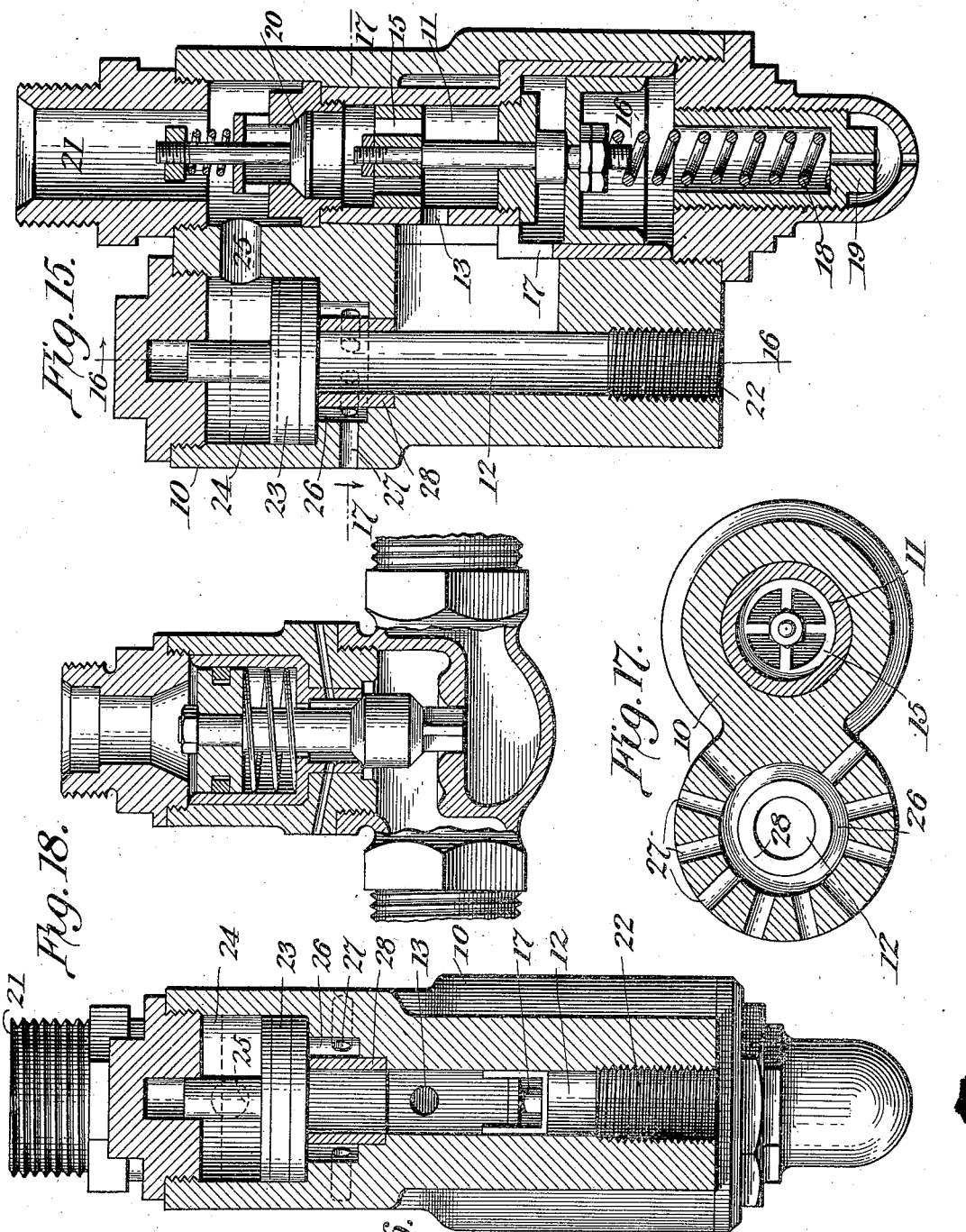

UNITED STATES PATENT OFFICE.

JAMES A. HICKS, OF ATLANTA, GEORGIA, ASSIGNOR TO HICKS' IMPROVED ENGINE BRAKE COMPANY, OF ATLANTA, GEORGIA, A CORPORATION OF GEORGIA.

FLUID-PRESSURE BRAKE SYSTEM.

944,486.   Specification of Letters Patent.   Patented Dec. 28, 1909.

Application filed September 24, 1907. Serial No. 394,373.

*To all whom it may concern:*

Be it known that I, JAMES A. HICKS, a citizen of the United States, residing at Atlanta, in the county of Fulton and State of Georgia, have invented certain new and useful Improvements in Fluid-Pressure Brake Systems, of which the following is a specification.

The present invention relates to fluid pressure brake systems or as they are commonly known, "air brakes," and has particular reference to engine and tank braking, the present invention relating specifically to an equipment associated with and connected to the "engineer's valve," as it is commonly called, so that, while the control and operation of the train brakes is in no way interfered with or their action modified, the construction admits of the application or release of the engine and tank brakes by means of straight air pressure independently of, or practically simultaneously with the manipulation of the train brakes; and such straight air pressure for the engine and tank brakes may be graduated so as to put the desired pressure into the brake cylinders; this pressure varying from minimum to maximum, as the needs of the service may require. In other words, provision is made whereby the engine-man may handle his entire line as a unit, or he may manipulate his train and engine brakes as distinct and independent instrumentalities; graduating his pressure as may be found desirable; so that a highly flexible system is provided.

Stated generally the invention comprises an equipment for engine and tank by means of which the braking is done by straight air pressure, and the cumbersome triples and auxiliaries with which engines under some systems now in use are provided, may be entirely dispensed with. This straight air braking of the engine may, under my system as herein described, be secured either by manipulating the engineer's valve with which my system is equipped and which is designed, as stated above, to handle not only the straight air for the engine and tank brakes, and graduate it to meet the demands of the service required, and also the automatic instrumentalities for actuating the train brakes; but it may also be accomplished by means of an independent controlling valve, which, together with certain automatic instrumentalities which will be described in detail hereinafter, permits application of the engine and tank brakes by the engineer without touching or bringing into action the main engineer's valve.

Stated more specifically, my system contemplates an equipment in which the main engineer's valve in addition to having the usual ports and passages for application and release of train brakes, is utilized in controlling the flow of straight air to the engine and tank brakes, certain automatically operating instrumentalities being provided so that the train and engine brakes may be brought into action or released quite independently of each other, and the pressure, furthermore, automatically and properly graduated.

The other feature of my improvements is the provision of a small or supplementary controlling valve, which is let into the system at a point and in such a manner as will give a control of the straight air for the engine and tank brakes which is independent of the control afforded by the main valve, such supplemental controlling valve, however, being so installed as that it will operate through some of the same coöperating automatic instrumentalities that control the engine and tank braking.

In devising the present system I have had in mind the desirability of a system which is simple in its construction and operation, and which may be installed without increasing or complicating to a cumbersome degree the engine equipment, and have so disposed the various instrumentalities making up the system as that economy of space is secured in the engine cab, while, at the same time, a readily manipulable and efficient apparatus is secured.

In the drawings herewith which illustrate one embodiment of my invention, to which drawings reference will be made in the detailed description hereinafter: Figure 1 is a diagrammatic view showing the system as applied to an engine and tank, certain parts of the profile drawing being shown in section for clearness of illustration. Fig. 2 is a plan view of the seat of the engineer's valve, the valve proper being diagrammatically illustrated in dotted lines on such seat in running position. Fig. 3 is a sectional view showing the automatic valve, the graduating valve, and the double-heading valve. Fig. 4 is a sectional view approximately on line 4—4 of Fig. 3, looking in the direction of the arrows, to show the arrangement of ports and passages in the graduating valve casing. Fig. 5 is a sectional view approximately on line 5—5 of Fig. 4, showing a vertical section of the graduating valve casing and the relative arrangements of the several ports and passages. Fig. 6 is a bottom plan view of the automatic and graduating valve casing shown in Fig. 3. Fig. 7 is a sectional view on line 7—7, Fig. 3, looking in the direction of the arrows. Fig. 8 is a sectional view on line 8—8, Fig. 7, looking in the direction of the arrows. Fig. 9 is a top plan view of the small controlling valve for the straight air for the engine and tank brakes, the valve handle being shown in its several positions; and the ports and passages being diagrammatically illustrated in dotted lines. Fig. 10 is a vertical sectional view of the valve shown in Fig. 9, approximately on the line 10—10 of Fig. 9, the handle being shown partially broken away. Fig. 11 is a top plan view of the valve seat with the valve and hood removed. Fig. 12 is a detail view of the valve and its operating stem separated for clearness of illustration, the valve being partly in section. Figs. 13 and 14 are bottom and top views, respectively, of the valve proper. Fig. 15 is a sectional view of the governor and quick release valve shown in Fig. 1. Fig. 16 is a sectional view approximately on the line 16—16, Fig. 15. Fig. 17 is a transverse sectional view approximately on line 17—17, Fig. 15. Fig. 18 is a sectional view of a release valve.

Referring to the drawings by numerals, 2 denotes the main engineer's valve, which is connected in the usual or any suitable manner with the usual main reservoir feed pipe 3 and the train pipe 4, the valve 2 having the usual or any desired operative disposition of ports and passages for operating the train brakes; and as my invention, so far as train braking is concerned, as an operation distinct from engine braking, does not differ from the usual automatic system, the said valve 2 is similar in all respects to the well known engineer's valve, such, for example, as is exhibited in the Westinghouse and Moore patent No. 401,916, dated April 23, 1889, now expired, and it is not deemed necessary for the purposes of the present invention to describe or illustrate in detail the parts of the engineer's valve necessary to train brake manipulation.

In addition to the usual connections and ports and passages for effecting train brake service, and the grease cellars for lubricating the valve, the valve 2 is provided with an additional passage 5 (see Fig. 1) by means of which straight air may be led from the hood, through the engineer's valve, the valve seat 6 and the valve 7 (see Fig. 2) being provided with ports 8 and 9, respectively, which, when brought to connecting position, will admit straight air from the hood through the engineer's valve, the function of this connection 5 being to feed up the line to the brake cylinders on the engine and tank and keep it primed for immediate action when the straight air from connections to be hereinafter described is thrown into the engine and tank brakes, or retain them if desired, after they have gone into action; and, furthermore, such connection 5 takes care of the exhaust from the line between the governor and quick release valve, presently to be described, and the engineer's valve. This connection 5 leads directly from the engineer's valve (see Figs. 1, 6, and 8) to a nipple or connection $6^a$ which delivers to the slide-valve chamber 101 in the automatic and graduating valves casings, which will shortly be described, from which chamber 101, by ports 102, 103, passage 104, and port 105, the air passes to connection 5 on the other side of the automatic valve casing, and thence through the governor and quick release valve 10, to the engine and tank brakes.

As the engineer's valve proper forms no part of the present invention so far as its detail structural features are concerned, but is only one element making up the system now disclosed, it is deemed unnecessary to illustrate or describe in detail the features thereof except so far as they are essential to an understanding of the present equipment.

In order to provide for an automatic application of straight air to the brake cylinders of the engine and tank when train-line is reduced and an application of train brake is made, or in event of accidental reduction of train-line pressure to a point where the efficiency of the system is menaced, or, as it is commonly termed, the engineman has "lost his air", I provide an automatic valve, which, in the present embodiment of the invention, comprises a suitable casing 29 which is coupled into the feed-up connection 5 by suitable connections and provided with a valve 30 which normally occupies the position shown in Fig. 1, leaving the connection 5 open from the engineer's valve through the governor valve to the brake cylinders for feed-up or retention as above described by means of the engineer's valve. The said valve 30 is held in this position, which may be termed its normal position, by means of train line pressure against a piston head 31 bearing against the stem $32^a$ of the valve 30, said piston head 31 being connected through a graduating valve, presently to be described, and thence by means of pipe 32, with the train pipe 4, as clearly shown in Fig. 1. The casing 29 in addition to the straight-air passage through it from the connection 5, is connected with the main reservoir pipe 3 by means of a pipe 33, a port 34 (see Fig. 3) being provided into the connection or pipe 5 on the brake cylinder side of the automatic valve, this port 34, as well as the through ports for the connection 5, being preferably formed in a valve shell or bushing 34ª seated in the main casing 29 and forming a smooth valve-casing for the valve 30. This main reservoir connection 33 is cut off when the valve 30 is in its normal position, with the proper train line pressure exerted upon the valve piston 31, the said valve 30 having preferably a coned end 35 which seats below the point in shell 34ª for the port 34 and cuts off the direct main reservoir pressure, leaving the port 105 open. It will be seen, therefore, that as long as the train line pressure is normal, the connection 5 from the engineer's valve will be open for straight-air flow, but if, for any reason, the pressure in pipe 32 against the piston 31 should be insufficient to overcome the main reservoir pressure exerted upon the valve head 35 the valve would be thrown to its open or upper position, closing the port 105, and opening the port 34 for main reservoir pressure, which will then pass by way of connection 5 on the brake cylinder side of the automatic, through the governor valve 10, to the brake cylinders.

The automatic valve just described, as shown in the present embodiment of my invention, comprises the stem 32ª which passes through a suitable packed joint 36, the said stem bearing against the valve member 30 which is cup-shaped and loosely mounted, in order that it may surely seat itself across the ports in the shell 34ª and there may be no leakage past the valve 30 when in this position. The valve operating piston 31 bears loosely against the valve stem 32ª, and I preferably provide this piston 31 with a buffer spring or washer 39 so as to cushion its blow when it is thrown down by train line pressure and to insure a tight metallic joint to resist the passage of air past the piston, a suitable relief port 40 (see Fig. 3) being provided to allow the escape of air beneath this closely fitting piston 31.

In order that the straight air pressure to the engine and tank brakes may be properly graduated, and the braking pressure proportionate to the service required put into the brake cylinders when the engineer's valve is manipulated for making application of the brakes, I provide between the automatic valve hereinbefore described and the train line pipe 32, a graduating valve or device, which comprises a valve casing 84 which rests upon and forms the top of the piston chamber 29ª of the automatic valve 30, hereinbefore described, said casing 84 having a passage 85 which connects piston chamber 29ª with slide valve chamber 86 by way of valve 45, and passage 88, said slide valve chamber communicating with piston chamber 89, and thence by passage 90, and pipe 32, with train line 4. Within the casing 84 is mounted the slide valve 92 having the piston 93 secured to the stem thereof, the slide valve 92 being in its general structure similar to the ordinary slide valve. Piston 93 reciprocates in a piston chamber 89 which is open on one side to train line pressure through the passage 90 and pipe 32, (see Figs. 1 and 3), and on the other side of said piston 93, chamber 89 is open to an auxiliary reservoir 95 through the pipe 96, the said auxiliary reservoir 95 and the train pipe 4 equalizing when the piston slide valve 92 is in the normal position shown in Fig. 3 through an equalizing groove 97 formed in the wall of the piston chamber 89, so that the piston and slide valve will be in balanced condition with equal pressures on both sides. The said slide valve 92 is provided with a groove 98 which is adapted to bridge the ports 99 and 100 when the valve moves forward to the position shown in Fig. 4, so as to relieve the pressure in the auxiliary reservoir 95 through the passage 106 and leakage groove 107, which communicates with the piston chamber 89 in rear of the piston 93. In this position of the valve, there is an open passage from the auxiliary reservoir 95 through the leakage groove 107, passage 106, port 99, and exhaust passage 100, to atmosphere, and it will be seen that when the graduating valve moves forward upon reduction of train line pressure in the pipe 4, and graduating valve connection 90, the piston 93 and the valve 92 will move to the release position shown in Fig. 4, relieving the pressure from the auxiliary reservoir 95 through the ports and passages described, and allowing a smooth action of the slide valve, due to the balanced arrangement of its piston. The slide valve 92 is provided also with a groove 108 which bridges ports 109 and 110, the said port 109 leading by means of passage 88 past the valve 45 hereinafter to be described, and passage 85, to the piston chamber 29ª of the automatic valve 30 hereinbefore described, while port 110 delivers to atmosphere. The two grooves 98 and 108 act simultaneously with respect to the ports 99, 100 and 109, 110, so that when the valve 92, moves to the position shown in Fig. 4 the pressure will be relieved from above the piston 31 and the valve 30 will be actuated by main reservoir pressure from pipe 33. By thus mounting a slide valve with a piston 93 exposed to train line pressure on both sides it will be seen that upon reduction of train pressure in the pipe 32 the pressure in the auxiliary reservoir 95 will move the piston 93 and its valve 92 forward to release position and effect a reduction above the piston 31 of the automatic valve in exact proportion to the amount of train pipe reduction, thus graduating the straight air pressure to the engine brake cylinders. After the graduating valve 92 has moved forward to the position shown in Fig. 4, it will be apparent that the pressure on the auxiliary reservoir side of the piston 93 will continue to bleed to atmosphere through the groove 107, passage 106, port 99, groove 98, and port 100, until the pressure in the auxiliary reservoir 95 has been reduced below the pressure on the train line side of the piston 93. Immediately this difference in pressure occurs, the predominating pressure on the train line side of the piston 93 will at once throw the piston 93 and its valve 92 to the normal position shown in Fig. 3, and the pressure on the train line side of the piston 93 will then equalize by means of the groove 97, on both sides of the piston 93, and above the piston 31 of the automatic valve, returning said automatic valve to its normal position as shown in Fig. 3. This construction enables the engineer to graduate the straight air going to his engine and tank brake cylinders automatically and he will only throw into the brake cylinders the pressure proportionate to the service desired instead of throwing into his cylinders the maximum main reservoir pressure as would be the case if the graduating feature was omitted.

I have now described the features of construction of my system in so far as they relate to automatic and graduated engine braking by straight air upon reduction of train line, through the automatic valve just described, and I will now describe the supplemental straight air controlling valve with which my system is equipped for engine braking, and its relation to the parts just described. The supplemental controlling valve 42 is substantially a threeway cock which is let into the main reservoir connection 3 at a point adjacent to the main engineer's valve 2. The controlling valve 42 has three leads, one of which, 43 passes to the usual gage (see Fig. 1), and is open in all positions of the valve to insure the desired communication between the gage and the air supply which it registers. The second lead 44 is connected by a suitable pipe with what is termed a retaining valve 45 (see Figs. 1 and 3) said retaining valve being mounted in a casing 112 let into the end of the graduating valve casing 84, the said retaining valve 45 controlling the port 113 which connects the passage 85 from piston chamber 29$^a$ of the automatic valve and passage 88, through the graduating valve and the pipe 32, to train line 4, the said retaining valve 45 normally being in the position shown in Fig. 3, with passages 85, and 88 in communication past the valve through port 113, the valve 45 being held in this position by a spring 49 bearing against the piston 47 connected to the valve stem 48 as shown. In this position of the valve 45 it closes relief port 50 formed in the lower part of the piston chamber 46, and under this condition of the retaining valve it will be apparent that pressure throughout the lead 44 from the supplementary controller 42 to the piston 47 of the retaining valve 45 will be relieved, and the port 113 will be open, so that train line pressure through passages 88, port 113, and passage 85, will be exerted upon the piston 31 to keep said piston in its lower position as shown in Fig. 3 with the main reservoir cut off valve 30 closed. When the controlling valve is thrown to the proper position to open this lead 44, main reservoir pressure will pass from the pipe 3, through the valve 42, by port 44, and then by pipe 51, to the chamber 46 above the piston 47, whereupon piston 47 will be forced over against the spring 49, the valve 45 will seat itself, cut off train line pressure through port 113 to the piston chamber 29$^a$ of the automatic valve and open the relief port 50 in the chamber 46. Immediately the valve 45 is seated and the port 50 is opened, the pressure above the piston 31 of the automatic valve 30 is released and exhausted through the port 50, whereupon the main reservoir pressure exerted through pipe 33 against the valve head 35 of the automatic valve 30, will throw the automatic valve to its open position, cut off the passage 105 from the main valve 2 to the brake cylinders, and permit constant main reservoir pressure from pipe 33 to pass by way of the port 34 to pipe 5 on the brake-cylinder side of the automatic valve 30, through governor and quick release valve 10, and to the brake cylinders.

From the foregoing it is seen that by means of the supplemental control valve 42, and the retaining valve 45, the engineer may, without disturbing the main rotary 2, throw the straight air from the main reservoir on to his engine and tank brakes, and this provision for supplemental control, is, I find, of great value, since it enables the engineer to manipulate the straight air for his engine and tank without using the main valve 2, while, at the same time, the devices are so interconnected that no interference in the operations of the two will take place. When the straight air has been thrown on to the brakes in the manner just described, it may be held until such time as the engineer wishes to release his engine brakes, which, it is apparent, are being held by full main reservoir pressure, minus, of course, the reduction made by the governor and quick release valve 10, he will throw the controlling valve 42 to the position necessary to open the third lead 52 with which the valve 42 is provided. This third lead 52 is connected by means of pipe 53 with a release valve 54 let into the connection 5 at a point between the automatic valve 30 and the governor and quick release valve 10. The said release valve 54, which is shown in Fig. 18, is identical in all respects with the retaining valve 45 shown in Fig. 3, being provided with the same arrangement of valve seat and valve, surmounted by a piston chamber, in which the piston and valve opening spring is placed, and having the same arrangement of relief ports as shown in the retaining valve in Fig. 3 and as above described. Normally this release valve is, of course, in open condition as shown in Fig. 18, so that it offers a free passage for pressure through the pipe 5 to the governor and quick release 10 and the brake cylinders. When, however, the controlling valve 42 is thrown to the proper position to open the lead 52 and throw main reservoir pressure through pipe 53 on to the top of the piston in the release valve 54, this valve will close at once, cutting off main reservoir pressure which had been established through pipe 5, and allow the pressure between the release valve 54 and the governor and quick release valve 10 to escape to the atmosphere through the relief ports in the lower part of the chamber, and it will be clear that, in the meantime, since main reservoir pressure has been cut off from the lead 44 of the controlling valve 42, pipe 51 and retaining valve 45, that train line pressure together with the spring 49 will throw the valve 45 of the retaining device to its normal or open position, again establish pressure from the train pipe against the piston 31 of the automatic valve 30, force said valve to its seat to open communication through pipe 5 from the valve 2 to the brake cylinders, and cut off main reservoir pressure through the port 34 by means of the valve head 35.

The controlling valve 42, the connections of which with the rest of the system have just been described, comprises a base portion 55, having formed thereon a valve seat 56, provided with a central port or passage 57, which communicates directly with the main reservoir pipe 3, said passage 57 having a port 58 which leads to the gage outlet 43, and it is apparent, therefore, that there is at all times an open gage connection with the main reservoir supply. The valve seat is provided, as well, with a port 59 communicating with the lead 44 to the retaining valve, and a second port 60 is provided communicating with the lead 52 for the release valve connection 53. The release valve port 60 is connected by means of a warning groove 61 with a port 62 leading by means of passage 63 (see dotted lines Fig. 9) to the atmosphere in order to provide for blowing and give a proper warning when the valve is in release position. Upon this valve seat 56 is placed the valve proper 54, this valve (54) being provided with a central opening 65 registering with the main reservoir passage 57, so that main reservoir pressure may enter the controlling valve for distribution beneath the top section or hood 66 which incloses the valve and valve-seat and is secured to the valve casing in any suitable manner, as by screws 67 passing through lugs formed on the hood 66 and the valve casing 55. The valve 54 is operatively connected with its actuating spindle 68 by a slot and fin connection (see Figs. 12, 13, and 14) the fin 69 on the spindle 68 entering the slot 70 in the valve, the said fin 69 having a cut-away portion 71, and the slot 70 having a centrally enlarged aperture 62, so as to permit free escape of air from passage 57 into the hood 66 past the slot and fin connection between the valve and its actuating spindle. In order to insure proper assemblage of the parts I preferably provide the fin 69 with offsets or projections 73 which engage cut-away portions 74 in the sides of the slot 70, and the spindle 68 at its handle receiving portion 75 is of irregular shape so that the handle 75 can only be positioned on the spindle in one way and thus a correct assemblage of the valve, the spindle, and the operating handle is always insured.

The valve 54 is provided with two ports 77 and 78, and a groove 79, (see Figs. 9, 13 and 14), which, in the normal position of the valve, said normal position being shown in Fig. 9, occupy the positions shown in dotted lines in said Fig. 9, with ports 77 and 78 blanked, and with the groove 79 catching the valve seat ports 59, 60, and 62, so that in this normal position the pressure will be relieved in both the lead 44, connecting pipe 51, and retaining valve 45, and the lead 52, connecting pipe 53, and release valve 54; the automatic valve 30 being maintained under these conditions in its normal position, as shown in Fig. 1, by train line pressure through the retaining valve port 113, against the piston of the automatic valve 30. When it is desired to throw the straight air on to the engine brakes by means of this supplemental controlling valve 42, the valve handle will be thrown to the position shown in dotted lines in Fig. 9, bringing the port 59 in the valve seat into communication with the port 78 in the valve so as to lead straight air from the hood 66 through valve port 78, valve seat port 59, lead 44, and pipe 51, to the retaining device 45. After an application has been made in the manner just described, immediately the valve handle is returned to the normal full line position shown in Fig. 9, the port 78 will be blanked; the groove 79, as hereinbefore described, will bridge the ports 59 and 62, at once relieving pressure above the retaining valve 45, through the pipe 51, and lead 44, whereupon the retaining valve 45, responding to train line pressure and the action of its spring 49, will return to normal position, opening the train line connection leading to the automatic valve 30, and train line pressure will then seat the automatic valve 30, shutting off main reservoir pressure and again opening the passage 5.

In order to provide for a release of the engine brakes independently of the train brakes after an application of both engine and train brakes by means of the main rotary valve 2, the supplemental controlling valve may be thrown to the dotted line position Y shown in Fig. 9, in which position the valve port 77 will be brought into register with the valve seat port 60, to permit straight air pressure to pass from beneath the hood 66, by ports 77 and 60, lead 52, and pipe 53 to the release valve 54, which will be thrown to closed position, cutting off the main reservoir pressure coming by pipe 5 to the brake cylinders, and relieving the pressure of the governor and quick release valve 10 and permitting release of brake cylinder pressure through the relief valve 23 hereinafter described.

The handle 76 for operating the valve spindle 68 has a spring-engaging-pin 80 which normally lies in a suitable notch formed on the edge of the hood 66, the said spring pin 80 riding out of the notch 81 and stopping against an abutment 82 when the valve is thrown to application position, where it will remain until the brakes have been held as long as desired, whereupon the handle 76 will be thrown to normal position, when the brakes will be released as above described. When the valve has been thrown to release position Y, above described, the pin 80 will ride up the incline 83, where it will be manually held until complete release of the brakes and will then automatically return to its normal position, as shown in full lines in Fig. 9, by the action of its spring pin 80 which will tend to ride down the incline 83, force the handle back to its normal position, and bring the valve into running position. This supplemental controlling valve for straight air braking has the advantage of enabling the engineer to pick up and set his engine brakes by main reservoir pressure in order to steady or slow his train, without the necessity of going to his main rotary for this purpose.

Although it will be seen that so far as manipulation of straight air for handling the engine brakes is concerned, this may be equally well performed with either the main rotary or the supplemental controlling valve just described, yet both these manipulations of the straight air are secured for the most part through the same instrumentalities and without unnecessarily complicating the equipment over the equipments now in use.

The release valve 10 to which the connection 5, hereinbefore described, leads, on its way to the brakes, is shown in detail in Figs. 15 to 17, to which reference will now be made, and comprises a casing having two chambers 11 and 12 which are connected by means of port 13 closed by a slide valve 15, the stem of which carries a piston head 16, subject to outlet pressure from the chamber 12 through a port 17, the said piston 16 being normally held in the position shown in Fig. 15 by means of a spring 18 located between the head of the piston 16 and an adjustable head screw 19 mounted in the end of the chamber 11, all as shown in Fig. 15. The spring 18 is so tensioned by means of said adjustable head screw 19, that it tends to force the valve 15 and piston 16 to a position to uncover the port 13, the spring 18 acting against the outlet pressure from the chamber 12 which acts upon the piston 16, which outlet pressure tends to force the valve 15 to position to close port 13. The chamber 11 is provided with a spring closed check valve 20 which opens into the chamber 11 but is closed against back pressure therefrom, and the chamber 11, has, as well, the inlet port or passage 21 from the pipe 5, while the chamber 12 has the outlet passage 22 leading to the brake cylinders. With this construction it will be seen that when straight air is led by passage 5 to the inlet port 21 it will pass the check valve 20, enter the inlet chamber 11 and if the pressure in outlet chamber 12 is below the desired point and the outlet pressure toward the brake cylinders does not exert sufficient pressure on the piston 16 to overcome the valve-opening stress of the spring 18, the port 13 will be uncovered and the straight air feed will pass through the port 13 from the chamber 11, to the chamber 12, until the pressure in chamber 12 has reached the point where it will force the piston 16 back, overcoming the spring 18, and moving the valve 15 to a position where it will close the port 13; and it will be seen that by regulating the pressure of the spring 18 through the instrumentality of the head screw 19 any desired ratio of pressures between the inlet chamber 11 and the outlet chamber 12 may be secured, and the feed of the air to the brake cylinders may be thus nicely regulated and governed.

In order to secure a quick release of the air from the brake cylinders when it is desired to release the engine brakes, the chamber 12 is provided with a check valve 23, mounted in a suitable valve chamber 24, which chamber communicates by means of a port 25 with the inlet chamber 11, so that as long as the pressure in chamber 11 remains constant the check valve 23 will occupy the position shown in full lines in Fig. 12. The said check valve 23 in this position closes a circular pocket 26 formed in the casing of the chamber 12, which circular pocket 26 communicates by a series of apertures 27 with the atmosphere, and is separated from the chamber 12 by means of a dam or skirt 28 so that while said pocket 26 is always open to the atmosphere through the apertures 27, it is closed against communication with the chamber 12 when the check valve 23 is in the full line position shown. When, however, the inlet pressure to chamber 11 is reduced for brake release, the brake cylinder pressure will unseat the valve 23, throwing it to dotted line position, and bring chamber 12 and pocket 26 into communication, allowing the brake cylinder pressure to exhaust to the atmosphere through the apertures 27, and this arrangement gives a very quick release of the brakes, avoids entirely the return of the air through a separate pipe from the brake cylinders, or through the feed pipe, as has heretofore been proposed, and, what is of great importance in actual practice, it avoids fouling the valves and passages of the system by leading the exhaust through them, for it will be seen that as soon as the pressure is taken off the check-valve 23 by exhausting the pipe or passage 5 leading to the governor valve, the brake cylinders will be released and exhausted through the apertures 27 without the necessity of passing the entire volume of air from the brake cylinders out through the passage 5 by means of a by-pass around the governor valve, and independent connections for releasing the air from the brake cylinders through the engineer's valve are entirely dispensed with.

Another important feature of the system is the provision of means by which the engine and tank brakes may be brought entirely under the control of one engineer during "double heading", as it is commonly called, or when two or more engines are coupled for handling an abnormally heavy train. This construction, which will now be described, I consider an important feature of my invention, as it enables me to put the control of the engine brakes of a double-header train, absolutely in the hands of one engineer, and this may be the engineer of the first or leading engine, which under ordinary circumstances, is the case; or, in case of derangement of the equipment of first engine so that the engineer of that locomotive cannot handle the air, the control may be as readily shifted to the second or any succeeding engine; the point being, that no matter which engine is selected to control the train, the engineer of that particular engine can control not only the train brakes and his own engine brakes, but also the brakes of any number of engines with which he may be coupled.

Referring to Figs. 1 and 3, it will be noticed that the slide-valve chamber 101, heretofore referred to, has a slide-valve 114 of ordinary design therein, which valve has a transverse groove 115 which normally bridges the ports 102, 103, which form the route for the straight air feed pipe 5 leading from the engineer's valve to the governor and quick release valve which has been described. The said valve 114 has a piston 116 in a chamber 118 which is held in the position shown in Fig. 3, by train-line pressure through passage 117, leading from the piston chamber 89, which, it will be remembered, is at train line pressure normally through the pipe 32 connecting with train pipe 4. The piston 116 has a leakage groove $116^a$ around it, so as to balance pressures on both sides and the piston and its valve 114, will, therefore, normally remain in the position shown in Fig. 3, with the valve groove 115 bridging ports 102, 103, and leaving a clear route by way of pipe 5. A second leakage groove $116^b$ is provided at the forward end of the piston chamber 118, in order to provide for equalization when the piston 116 and its valve 114 has moved to its forward position upon reduction of train-line pressure, as will be more fully set forth hereinafter. The leakage groove $116^b$ is provided at the forward end of the piston chamber 118, in order to provide for equalization when the piston 116 and its valve 114 has moved to its forward position upon reduction of train-line pressure, as will be more fully set forth. The piston chamber 118 is connected by pipe 119 with the pipe 120 which leads from the equalizing piston (not shown) of the engineer's valve to the equalizing reservoir 121, in the usual manner, this connection being by means of a three-way cock 122 which normally establishes communication between the equalizing piston of the engineer's valve and reservoir 121, but which, when "double-heading," is thrown on all the engines except that one which is handling the air, to connect the reservoir 121 with the piston chamber 118. Under these conditions, the engineer having control of the "double-header" (whether the first or second engineman) will be able to produce a substantially simultaneous and similar action of the engine and tank brakes of both engines. When he makes an application and reduces train-line pressure on the graduating valve piston 93, moves said valve 92, and effects a reduction on the piston 31 of the automatic valve 30 and throws main reservoir pressure into the brake cylinders of both engines, the double-heading valve 114 on the second engine under reduction of train-line pressure on its piston 116 through the passage 117, moves over under the pressure from reservoir 121 coming through pipe 119, so as to cut off the passage 5 and prevent taking pressure off the release valve 23 in the governor and quick-release 10 by way of passage 5, and ports 8 and 9 in the engineer's rotary valve; it being understood that in double-heading this main rotary valve 2 on the second engine is left in running position. When a reduction has been made the pressures on both sides of piston 116 will equalize through groove 116ᵇ, so that as soon as train line rises it will force the piston 116 and valve 114 back to the normal position shown in Fig. 3, cutting in this groove 116ᵃ and bringing about equalization on both sides of the piston again. The equipment of the second engine will thus be under the absolute control of the engineer of the first locomotive, and he may reduce train line pressure and operate the automatic and graduating valves of both engines as needed; the usual cut-out cock 123 being provided in the train-line pipe 4 to cut off the engineer's valve of the second engine and prevent danger of feed-up and kicking off of the brakes by the second engineman. Obviously the same construction may be secured on the second engine of a "double-header," by simply reversing the arrangement above described.

While I have shown a particular embodiment of my invention, and that the best now known to me, I wish it to be distinctly understood that since numerous changes within the skill of the mechanician may be made without departing from the principles of my invention, I do not limit myself to any of the details of construction shown and described, except in so far as I am limited by the prior art to which this invention belongs.

Having fully disclosed my invention, I claim:

1. In a combined automatic and straight air brake system, a straight air pressure supply, a straight air brake cylinder connection, a valve in said connection opening automatically under supply pressure, and means for automatically graduating the action of said supply valve.

2. In a combined automatic and straight air brake system, a straight air pressure supply, a straight air brake cylinder connection, a valve in said connection opening automatically under supply pressure, a pressure controlled graduating valve for automatically controlling said supply valve, and manually operated means to control pressure on said graduating valve.

3. In a combined automatic and straight air brake system, a straight air pressure supply, a straight air brake cylinder connection, a valve in said connection opening automatically under supply pressure, a graduating valve subject to train-line pressure to control said supply valve, and train line pressure controlling means to control said graduating valve.

4. In a fluid pressure brake system, a straight air pressure supply, a straight air brake cylinder connection, a pressure-controlled valve in said connection opening automatically under supply pressure, a graduating valve subject to train-line pressure controlling said supply valve, and train line pressure controlling means to control said graduating valve.

5. In a fluid-pressure brake system, a straight air pressure supply, a straight air brake cylinder connection, a valve in said connection opening under supply pressure and normally closed by train-line pressure, a graduating valve controlling train-line pressure on said supply valve, and means for controlling said graduating valve.

6. In a fluid-pressure brake system, a pressure supply, a brake cylinder connection, a valve in said connection opening under supply pressure and normally closed by train-line pressure, a graduating valve controlling train-line pressure on said supply valve and manually operable means to control said graduating valve.

7. In a combined automatic and straight air fluid-pressure brake system, a straight air pressure supply, a straight air brake cylinder connection, a valve in said connection opening under supply pressure and normally closed by train-line pressure, a graduating valve controlling train-line pressure on said supply valve, and manually operated means controlling said graduating valve.

8. In a combined automatic and straight air fluid-pressure brake system, a straight air pressure supply, a straight air brake cylinder connection, a train line pressure supply and a normally closed valve in said connection opening under supply pressure and closed by train-line pressure.

9. In a fluid-pressure brake system, a main reservoir, a brake cylinder connection from that reservoir, a valve in said connection opening under main reservoir pressure, a train-line connection holding said valve normally closed under train-line pressure, and a graduating valve controlling train-line pressure on said first-named valve.

10. In a fluid-pressure brake system, a main reservoir, a brake cylinder connection from that reservoir, a supply valve in said connection opening under main reservoir pressure, a train-line connection holding said valve normally closed under train-line pressure, and a pressure-controlled graduating valve controlling train-line pressure on said supply valve.

11. In a fluid-pressure brake system, a main reservoir, a brake cylinder connection from that reservoir, a supply valve in said connection operating under main reservoir pressure, a train-line connection holding said valve normally closed under train-line pressure, and a graduating valve responsive to train-line pressure controlling train-line pressure on said supply valve.

12. In a fluid-pressure brake system, a main reservoir, a brake cylinder connection with that reservoir, a supply valve in said connection opening under main reservoir pressure, a train-line connection normally holding said valve closed under train-line pressure, and a graduating valve responsive to train-line pressure to reduce train-line pressure on said supply valve.

13. In a fluid-pressure brake system, a main reservoir, a brake cylinder connection with that reservoir, a supply valve in said connection opening under main reservoir pressure, a train-line connection normally holding said valve closed under train-line pressure, a graduating valve responsive to train-line pressure controlling said supply valve, and manually operated means to control said graduating valve.

14. In a fluid-pressure brake system, a main reservoir, a brake cylinder connection with that reservoir, a supply valve in said connection opening under main reservoir pressure, a train-line connection holding said valve normally closed under train-line pressure, and a slide-valve normally balanced under train-line pressure controlling said train line connection.

15. In a fluid-pressure brake system, a main reservoir, a brake cylinder connection with that reservoir, a supply valve in said connection opening under main reservoir pressure, a train-line connection normally holding said supply valve closed under train-line pressure, a piston slide valve controlling said train-line connection, a train-line connection feeding pressure against one side of said slide valve, and a train line reservoir delivering pressure against the other side of said slide valve.

16. In a fluid-pressure brake system, a main reservoir, a brake cylinder connection with that reservoir, a piston supply valve in said connection opening under main reservoir pressure, a train-line pressure connection standing against said valve piston and normally holding said valve closed under train-line pressure, a piston slide valve controlling train-line pressure against said supply valve, a train line connection feeding against one side of said slide valve and a balancing train line reservoir feeding pressure against the other side of said slide valve.

17. In a fluid-pressure brake system, a main reservoir, a brake cylinder connection with that reservoir, a supply valve responsive to train-line pressure normally closing said connection, and manually operable pressure controlling means independent of train-line controlling said valve.

18. In a fluid-pressure brake system, a main reservoir, a brake cylinder connection with that reservoir, a supply valve responsive to train-line pressure normally closing said connection, and pressure controlled means independent of train-line controlling said valve.

19. In a fluid-pressure brake system, a main reservoir, a brake cylinder connection with that reservoir, a supply valve responsive to train-line pressure normally closing said connection, and a valve responsive to main reservoir pressure to give an independent control of said supply valve.

20. In a fluid-pressure brake system, a main reservoir, a brake cylinder connection with that reservoir, a supply valve responsive to train-line pressure normally closing said connection, a valve responsive to main reservoir pressure to give independent control of said supply valve, and manually operable means to direct main reservoir pressure to said independent valve.

21. In a fluid-pressure brake system, a main reservoir, a brake cylinder connection with that reservoir, a supply valve responsive to train-line pressure normally closing said connection, and an independent valve to cut off train-line pressure from said supply valve and permit it to open under main reservoir pressure.

22. In a fluid-pressure brake system, a main reservoir, a brake cylinder connection with that reservoir, a supply valve responsive to train-line pressure normally closing said connection, and a pressure controlled cut-off valve to interrupt train-line pressure on said supply valve and permit it to open under main reservoir pressure.

23. In a fluid-pressure brake system, a pressure supply, a brake cylinder connection from said supply, a supply valve responsive to train-line pressure normally closing said connection, and an independent pressure controlled valve operable to cut off train-line pressure from said supply valve and permit it to open.

24. In a fluid-pressure brake system, a main reservoir, a brake cylinder connection with that reservoir, a supply valve responsive to train-line pressure normally closing said connection, and an independent valve operable to release said pressure controlled supply valve and prevent reduction of train-line pressure.

25. In a fluid-pressure brake system, a main reservoir, a brake cylinder connection with that reservoir, a valve in said connection opening automatically under main reservoir pressure, a train connection normally holding said valve closed under train line pressure, and an independent pressure controlled valve to release said supply valve and retain pressure in the train line.

26. In a fluid-pressure brake system, a main reservoir, a brake cylinder connection with that reservoir, a supply valve opening automatically under main reservoir pressure in said connection, a train-line connection holding said valve normally closed under train-line pressure, a graduating valve controlling said supply valve, and an independent valve to relieve said supply valve of train-line pressure and retain train-line.

27. In a fluid-pressure brake system, a main reservoir, a brake cylinder connection with that reservoir, a supply valve opening automatically under main reservoir pressure in said connection, a train-line connection holding said valve normally closed under train-line pressure, a graduating valve controlling said supply valve, and an independent pressure controlled valve to relieve said supply valve of train-line pressure and retain train-line.

28. In a fluid-pressure brake system, a main reservoir, a brake cylinder connection with that reservoir, a supply valve opening automatically under main reservoir pressure in said connection, a train-line connection holding said valve normally closed under train-line pressure, a graduating valve controlling said supply valve, an independent valve to relieve said supply valve of train line pressure and retain train-line, and a manually controlled main reservoir connection to said independent valve.

29. In a fluid-pressure brake system, a main reservoir, a brake cylinder connection from said main reservoir, a normally closed valve in said connection opening automatically under main reservoir pressure, a manually controlled second main reservoir pressure passage around said normally closed valve, and pressure controlled means for automatically cutting out said second passage.

30. In a fluid-pressure brake system, a main reservoir, a brake cylinder connection from said main reservoir, a normally closed valve in said connection opening automatically under main reservoir pressure, a manually controlled second main reservoir pressure passage around said normally closed valve, and a pressure-controlled slide valve for automatically cutting out said second passage.

31. In a fluid-pressure brake system, a main reservoir, a brake cylinder connection from said main reservoir, a normally closed valve in said connection opening automatically under main reservoir pressure, a manually controlled second main reservoir pressure passage around said normally closed valve, a slide valve controlling said second passage, and a pressure connection between said slide valve and a source of pressure.

32. In a fluid-pressure brake system, a main reservoir, a brake cylinder connection with said reservoir, a normally closed supply valve responsive to train-line pressure and opening automatically under main reservoir pressure in said connection, a second normally open main reservoir passage around said supply valve, and a slide valve responsive to train-line pressure controlling said second passage.

33. In a fluid-pressure brake system, a main reservoir, a brake cylinder connection with said reservoir, a normally closed supply valve responsive to train-line pressure and opening automatically under main reservoir pressure in said connection, a second manually controlled main reservoir passage around said supply valve, and a valve responsive to train line pressure controlling said second passage.

In testimony whereof I affix my signature in presence of two witnesses.

JAMES A. HICKS.

Witnesses:
A. V. CUSHMAN,
G. M. STUCKER.